United States Patent [19]

Moses

[11] Patent Number: 5,388,768
[45] Date of Patent: Feb. 14, 1995

[54] SPRAY GUN WITH A CATALYST INJECTOR AND A MANIFOLD BLOCK

[75] Inventor: Jeffrey D. Moses, North Liberty, Iowa

[73] Assignee: American Matrix Technologies, Inc., Iowa City, Iowa

[21] Appl. No.: 124,100

[22] Filed: Sep. 20, 1993

[51] Int. Cl.⁶ .............................................. B05B 7/04
[52] U.S. Cl. ................ 239/417.5; 239/427; 239/428; 239/432
[58] Field of Search .............. 239/398, 407, 413, 414, 239/417.5, 427, 428, 432, 525, 600, DIG. 8

[56] References Cited

U.S. PATENT DOCUMENTS

| | | |
|---|---|---|
| 3,179,341 | 4/1965 | Plos et al. ............................ 239/414 |
| 3,396,067 | 8/1968 | Schafer . |
| 3,399,837 | 9/1968 | Frick ............................ 239/600 X |
| 3,795,364 | 3/1974 | Kattner ............................ 239/432 X |
| 4,033,481 | 7/1977 | Hicks et al. ...................... 239/414 X |
| 4,244,993 | 1/1981 | Platka, III et al. . |
| 4,247,364 | 1/1981 | Culp . |
| 4,262,847 | 4/1981 | Stitzer et al. .................... 239/414 X |
| 4,267,285 | 5/1981 | Broutman . |
| 4,369,224 | 1/1983 | Cordts et al. . |
| 4,374,892 | 2/1983 | Roberts . |
| 4,463,041 | 7/1984 | Takuji et al. . |
| 4,486,494 | 12/1984 | Eldin . |
| 4,568,604 | 2/1986 | Kurtz et al. . |
| 5,143,296 | 9/1992 | Saurwein et al. ........ 239/DIG. 8 X |
| 5,219,097 | 6/1993 | Huber et al. .................... 239/414 X |

FOREIGN PATENT DOCUMENTS 726567  3/1955  United Kingdom .

*Primary Examiner*—William Grant
*Attorney, Agent, or Firm*—Brian J. Laurenzo; Kent A. Herink; Brett J. Trout

[57] ABSTRACT

An apparatus for mixing and spraying a catalyst with a resin onto a surface. The resin and catalyst are delivered to a mixer having no O-rings which could become clogged with catalyzed resin and destroy the gun. The manifold is connected to a mixer which is connected to an air supply. The spray gun eliminates the need for any check valves within the manifold.

11 Claims, 3 Drawing Sheets

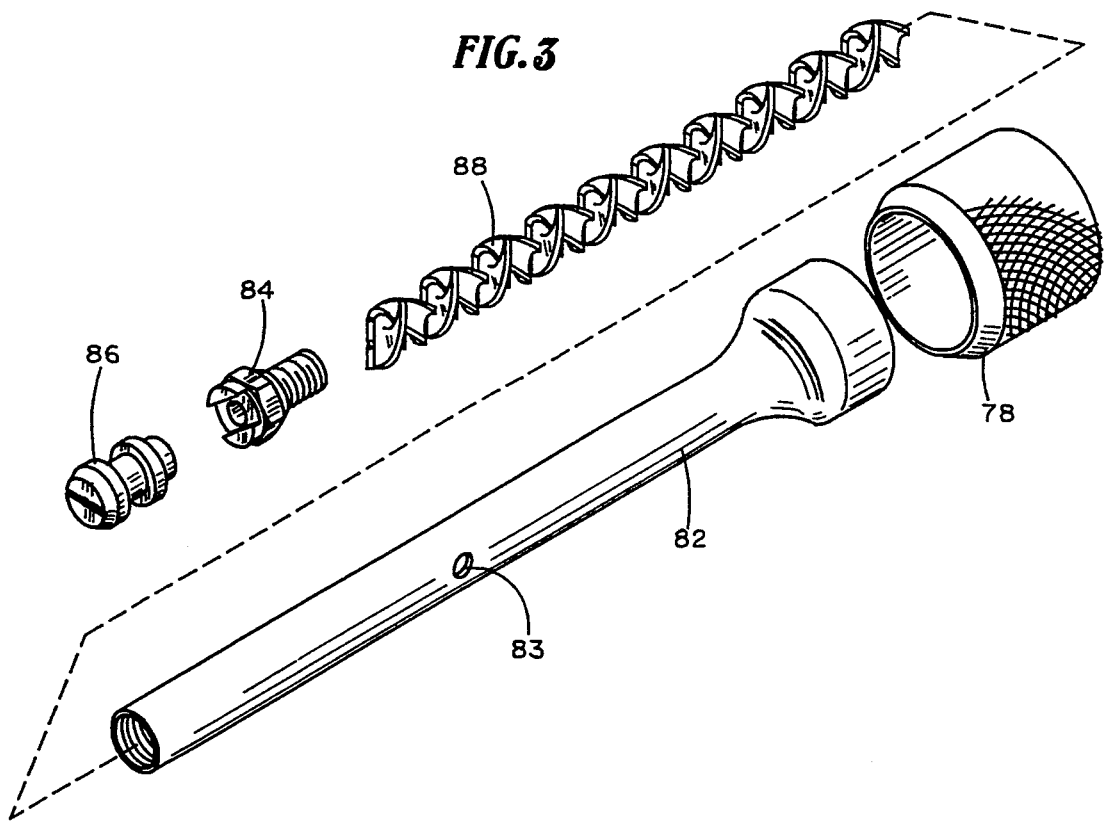
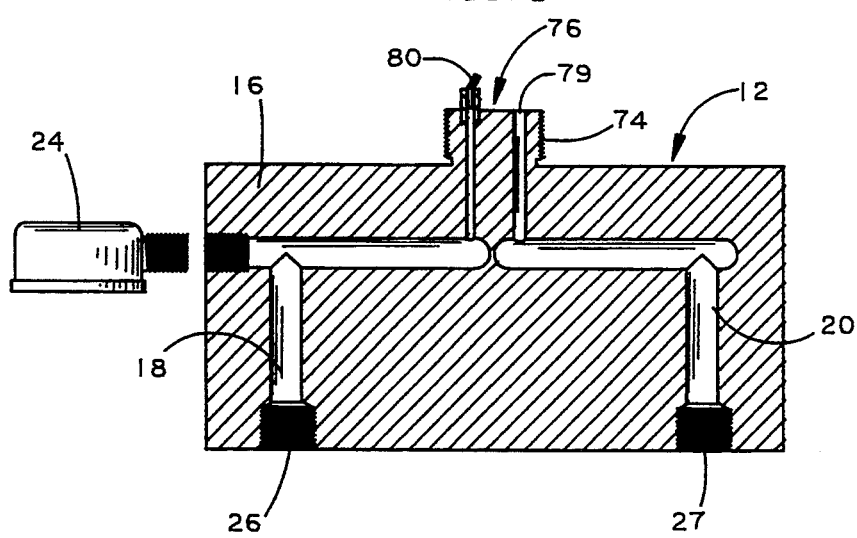

SPRAY GUN WITH A CATALYST INJECTOR AND A MANIFOLD BLOCK

BACKGROUND OF THE INVENTION

This invention relates to an apparatus for mixing a resin and a catalyst and, more particularly, to an apparatus for efficiently mixing a high viscosity heavily filled resin with a catalyst wherein a manifold supplying the resin and catalyst has no O-rings or check valves which could potentially clog and destroy the apparatus.

Resins have numerous uses including, but not limited to the construction of swimming pools, the exterior coating of buildings, the protective interior coating of tanks, as well as the protective coating of secondary containment walls. A resin such as polyester is typically applied to a surface with a catalyst such as methyl-ethyl-ketone peroxide. Catalysts allow the resin to polymerize and cure. The present state of the art methods of resin application involve the spraying of the resin and methyl-ethyl-ketone peroxide onto a particular surface with either an internal mix or external mix spray gun.

An internal mix gun is often used when solvent emissions are a problem, because internal mixing limits the amount of atomized catalyst exiting the gun. Internal mix guns generally have at least two feed lines, a resin line and a catalyst line, which feed into a manifold. The resin and catalyst are typically mixed in this manifold. After mixing, the resin and catalyst are expelled from the gun in confluence and under pressure through a nozzle or similar orifice. The resin and catalyst are expelled from the gun with sufficient pressure to atomize the resin and catalyst mixture and give the article being sprayed an even coat of catalyzed resin. A major drawback of this type of gun is that when a spraying operation is completed, the catalyzed resin remaining within the manifold begins to harden. If not removed, the hardening resin will set up within the manifold. Resin which has hardened within the manifold is extremely difficult, if not impossible to remove. Removal requires expensive and time-consuming cleanings. Often removing hardened resin from a manifold causes so much damage that the costly manifold must be discarded.

To remove resin from the manifold after a spraying operation, most internal mix guns are equipped with a third feed line. This feed line supplies acetone or similar solvent to the manifold to flush the manifold after completion of a spraying job. While such a flushing system is typically adequate to dislodge most of the resin from the manifold, the solvent cannot remove all of the catalyzed resin. O-rings within the gun, used to surround check valves, often become so irreparably damaged by resin build-up, even with a solvent flush, that the gun must often be rebuilt or discarded over time.

A larger problem with the internal mix gun is the use of a solvent and the disposal thereof. Acetone and methylene chloride are the most popular solvents for internal mix guns, but have recently come under strict regulation due to their harmful effects on humans and the environment. Waste solvent from manifold cleaning poses a threat to humans and the environment. In an operation with many guns, which must be flushed hundreds of times per day, the accumulated waste solvent becomes a serious environmental hazard. Government regulations are moving toward a complete ban of all outdoor solvent flush. Although it is possible to reclaim waste solvent through the use of a reclaimer, these devices are extremely costly in terms of both time and money. Furthermore, even a reclaimer produces hazardous "still bottoms" which add to landfill contamination.

The second type of gun typically used is an external mix gun. In an external mix gun, the resin and catalyst are atomized and expelled separately and directed toward one another. The resin and catalyst combine in the air shortly before contacting the article being treated. With the external mix gun, the manifold and solvent flushing are eliminated along with the accompanying disposal problems. A major drawback of the external mix gun, however, is the incomplete mixing of resin and catalyst, which often leads to patches of incompletely catalyzed resin appearing on the finished article. Such portions of uncatalyzed resin can produce points of weakness or blisters on the surface of the finished article.

A more important problem with external mix guns is the exterior atomization of the catalyst. Because of the incomplete mixing of the catalyst with the resin, much of the atomized catalyst disperses into the atmosphere and, more particularly, in the immediate work environment where the application is taking place. Concern over the safety of workers breathing catalyst contaminated air has led to numerous restrictions on the use of external mix guns. Such guns have even been completely banned in at least one state.

The difficulties encountered in the prior art discussed herein above are substantially eliminated by the present invention.

SUMMARY OF THE INVENTION

Accordingly, it is an object of the present invention to provide an apparatus for applying a resin and a catalyst to a surface wherein the apparatus has no O-rings which contact catalyzed resin.

A further object of the present invention is to provide an apparatus for applying a resin and a catalyst to an article wherein no solvent flush is required to remove catalyzed resin from the application apparatus.

Another feature of the present invention is to provide an apparatus for dispensing heavily filled resins containing fillers such as silicates, ceramics, gypsum, wood, calcium carbonate, cellulose, glass fibers, or gel coat.

These and other objects of the present invention will become apparent upon reference to the following specification, drawings, and claims.

By the present invention, it is proposed to overcome the difficulties encountered heretofore. To this end, a catalyst and resin sprayer is provided capable of providing a resin in confluence with a catalyst, whereby the resin and catalyst are mixed and atomized through the addition of pressurized air into the catalyst and resin mixture. The sprayer is also capable of applying the atomized mixture to a surface to provide a catalyzed resin coating on the surface. The sprayer is provided with a mixer capable of receiving and mixing the resin and catalyst into a substantially homogeneous mixture. The mixer is also capable of receiving the pressurized air in confluence with the resin and the catalyst to thereby produce an atomized flow of resin and catalyst.

Operably connected to the mixer is a manifold capable of directing the resin and catalyst into the mixer. The manifold is a block having two sides with at least a pair of passages extending from the first side of the block to the second side. The passages are substantially unobstructed and contain no O-rings which contact catalyzed resin and which could become plugged, requiring reconstruction of the gun.

In the preferred embodiment of the present invention, the mixer is a disposable mixer releasably connected to the manifold. Resin and catalyst hoses feed into the manifold, which directs the catalyst and resin into the disposable mixer. The disposable mixer terminates in a spray tip. An air tube is attached to the disposable mixer between the manifold and the spray tip to aid in the atomization of the catalyzed resin and to more forcefully spray the catalyzed resin onto the article being treated.

BRIEF DESCRIPTION OF THE DRAWINGS

In the drawings:

FIG. 3 is an exploded perspective view of the nozzle tip, ferrule and disposable static mixing tube of the present invention;

FIG. 4 is a top cross-sectional view of the manifold of the present invention;

DETAILED DESCRIPTION OF THE INVENTION

Figure 1:
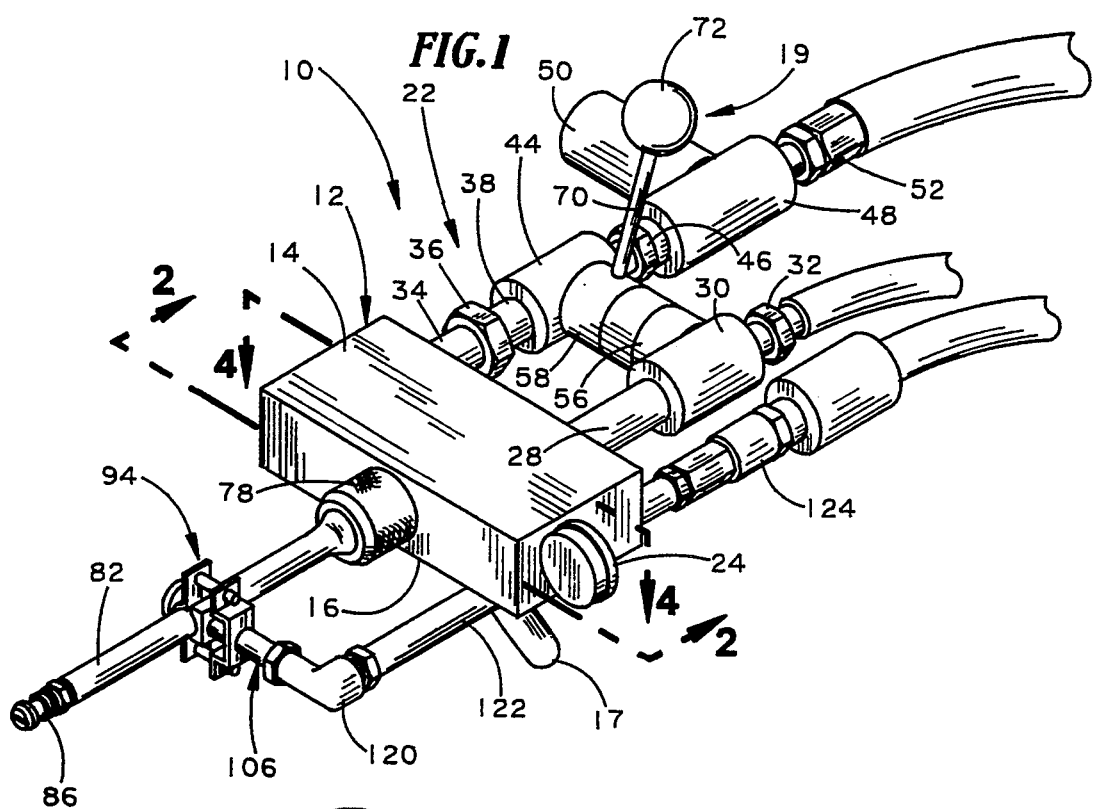
FIG. 1 is a perspective view of the spray gun of the present invention.

In the Figures, a resin application system, specifically, a spray gun 10 is provided with a manifold 12, having a catalyst inlet 26 and a resin inlet 27 (FIGS. 1 and 4). The gun 10 is used to apply heavily-filled systems to a surface. Examples of fillers which may be added to resins to reduce cost or add quality include: silicates, ceramics, gypsum, wood fillers, calcium carbonate, cellulose, glass fibers, and gel coat. These fillers act as extenders or reinforcements of the base resin.

Extending from the manifold 12 is a disposable static mixing tube 82 which terminates in a spray tip 86 (FIG. 1). The gun 10 has an air tube 122 which is secured to the side of the static mixing tube 82 to atomize and spray catalyzed resin from the static mixing tube 82 through the spray tip 86.

In the preferred embodiment of the present invention, the manifold 12 is a tooled aluminum block about 15 centimeters wide, 10 centimeters long, and 3 centimeters deep (FIG. 1). The manifold is a one-piece drilled block having a top 14 and a bottom 16. Secured to the bottom 16 of the manifold 12 is a tapered handle 17, which is preferably angled toward a switch handle 19. The angle of the handle 17 makes the gun 10 easier to hold as it is being operated.

The manifold 12 is tooled with channels forming two cylindrical passageways, a catalyst passageway 18 and a resin passageway 20 (FIG. 4). The passageways 18 and 20 begin at one end of the manifold 12 and terminate at the opposite end of the manifold 12. These passageways 18 and 20 are unique in that they are not provided with check valves or O-rings. As resin and catalyst are not mixed within the manifold 12, there is no need to provide check valves to prevent backflow of catalyzed resin into the passageways 18 and 20. O-rings associated with such check valves can also be eliminated. The life of the gun 10 is thereby extended over conventional guns which must be overhauled or discarded when manifold O-rings become coated with hardened resin.

Connected to the catalyst passageway 18 is a pressure gauge 24 which is mounted to the exterior of the manifold 12, yet operably connected to the passageway 18 to keep the operator informed of the pressure at which the catalyst is moving through the passageway 18 (FIG. 4). The pressure gauge 24 is very effective as an alarm for the present invention, not only warning an operator of a problem, but diagnosing the problem as well.

Preferably, the gauge 24 measures pressures from zero to over one thousand pounds per square inch. During normal operation, the spray gun 10 is operated with a catalyst pressure of between two hundred and four hundred pounds per square inch. If the pressure drops below two hundred pounds per square inch, the pump (not shown) providing catalyst to the gun 10 should be adjusted to increase the flow of catalyst through the gun 10. If the pressure quickly rises to over one thousand pounds per square inch, the gun 10 is likely blocked with a plug of resin. The gun 10 must then be cleared of any obstruction. If the pressure rises and falls between zero and a normal pressure, the catalyst pump is likely only pumping on one stroke instead of two. The pump must then be repaired to assure accurate application of catalyst and resin. Although a catalyst pressure range of between two hundred and four hundred pounds per square inch is given as an example, the pressure may be lower or higher depending on the particular application.

Figure 5:
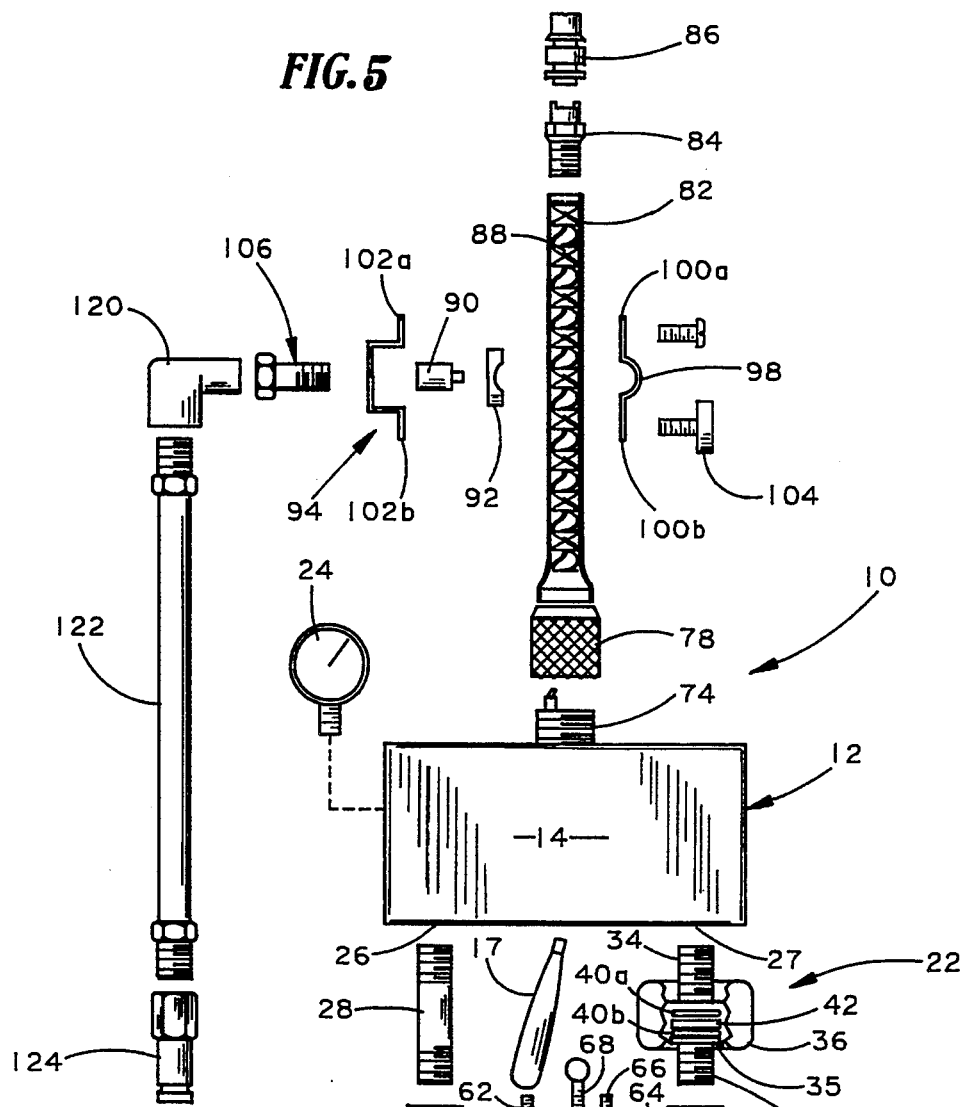
FIG. 5 is an exploded view of the spray gun of the present invention.

Mounted to the catalyst input 26 of the manifold 12 is a stainless steel catalyst pipe nipple 28 (FIG. 5). It is very important to ensure that all parts of the device which come into contact with the catalyst are non-reactive with the catalyst. Contact of methyl-ethyl-ketone peroxide with steel or brass or similar reactive material may cause a deadly explosion. The nipple 28 consists of a short section of pipe which connects the manifold 12 to a catalyst ball valve assembly 30. The catalyst ball valve assembly 30 is preferably a one-quarter inch high pressure ball valve, constructed of stainless steel to avoid reaction with the catalyst. The ball valve assembly 30 is connected to a threaded catalyst line connector 32, which allows the spray gun 10 to be connected and disconnected to a catalyst supplying apparatus (not shown). The ball valve assembly 30 thereby acts as a "trigger" to start and stop the flow of catalyst through the gun 10.

Connected to the resin input 27 of the manifold 12 is a restricted orifice union 22 (FIG. 5). The restricted orifice union 22 consists of an orifice nipple 34, a coupling nut 36, and a resin connection pipe 38. The coupling nut 36 is in slidable engagement with the resin connection pipe 38 and prevented from coming off of the end of the resin connection pipe 38 by a flange 35 provided on the end of the resin connection pipe 38. Positioned between the orifice nipple 34 and the resin connection pipe 38 are a pair of O-rings 40a–b and an orifice plate 42. The orifice plate 42 is provided with an opening of a smaller diameter than the interior diameter of the orifice nipple 34. The orifice plate 42 is positioned between the orifice nipple 34 and the resin connection pipe 38 and the coupling nut 36 is screwed onto the orifice nipple 34. The coupling nut 36 is tightened until the orifice plate 42 is pressed tightly enough between the O-rings 40a–b to prevent the passage of resin between the O-rings 40a–b and the orifice plate 42.

The diameter of the hole in the orifice plate 42 is somewhat smaller than the interior diameter of the resin connection pipe 38 so that a plug passing through the resin connection pipe 38 is stopped at the orifice plate 42 before entering the manifold 12. When such a clog occurs, the force of spray from the gun 10 will substantially decrease, thereby notifying the operator that the coupling nut 36 must be removed from the orifice nipple 34. After the coupling nut 36 has been removed from the orifice nipple 34, the orifice plate 42 is removed and the resin connection pipe 38 is cleared of any obstruction. The restricted orifice union 22 thereby allows quick, in-the-field removal of plugs. The restricted orifice union 22 is extremely useful as no tools are required to remove plugs from the resin line, even in the field. It is imperative to remove plugs from the line before such plugs reach the resin passageway 20 of the manifold 12, where they would require extensive downtime to be removed (FIGS. 4 and 5).

Connected to the resin connection pipe 38 is a resin ball valve assembly 44 (FIG. 5). The resin ball valve assembly 44 is a one-quarter inch high pressure stainless steel ball valve, preferably capable of withstanding pressures up to two thousand pounds per square inch. A T-valve adapter 46 connects the resin ball valve assembly 44 to a T-valve 48. The right-angle connection of the T-valve 48 is connected to a fluid relief valve 50 which, in the preferred embodiment, is a ⅜ inch standard ball valve. The opposite end connection of the T-valve 48 is connected to a fluid hose T-adapter 52. The fluid hose T-adapter 52 allows the spray gun 10 to be quickly connected and disconnected from a resin hose and supply apparatus. The resin relief valve 50 allows the escape of resin through the valve 50 to prevent extreme pressure from building up and damaging more delicate portions of the gun 10.

The relief valve 50 is provided with a handle 51 which opens and closes the valve 50. The handle 51 may be opened and the valve 50 placed over a reservoir of resin (not shown) to purge the line of air before spraying. The valve 50 may also be used to recycle resin which has been sitting in the line for an extended period of time to prevent settled resin from being applied to a surface.

Operably connected between the catalyst ball valve assembly 30 and the resin ball valve assembly 44 is a ball valve yoke 54, which, when rotated, simultaneously opens both the catalyst ball valve assembly 30 and the resin ball valve assembly 44 (FIG. 5). The ball valve yoke 54 is composed of two pieces, a catalyst connector 56 and a resin and handle connector 58. The catalyst connector 56 is a cylindrical piece of metal which fits over a catalyst ball valve assembly orifice control 60 and is attached thereto by means of a set screw 62.

The resin and handle connector 58 is also a cylindrical piece of steel, but fits over the resin ball valve orifice control 64 (FIG. 5). The resin and handle connector 58 is attached to the resin ball valve orifice control 64 by means of a set screw 66. The internal circumference of the free end of the resin and handle connector 58 is substantially similar to the outer circumference of the catalyst connector 56. The free end of the catalyst connector is inserted into the free end of the resin and handle connector 58 and connected thereto by means of a thumb screw 68.

A switch handle shaft 70 is secured to the resin and handle connector 58. In the preferred embodiment, the switch handle shaft 70 is a steel rod threaded on either end. One end of the shaft 70 is screwed into the resin and handle connector 58, and a handle ball 72 is screwed onto the opposite end of the switch handle shaft 70 to make the shaft 70 easier to grasp and maneuver.

In the preferred embodiment of the present invention, when the shaft is perpendicular to both the catalyst pipe nipple 28 and orafice nipple 34, the ball valves 30 and 44 are closed, thereby preventing the flow of either catalyst or resin into the manifold 12 of the spray gun 10. When the handle ball 72 is pushed toward the manifold 12, the catalyst ball valve assembly 30 and resin ball valve assembly 34 are opened, thereby allowing catalyst and resin to enter the catalyst and resin passageways 18 and 20 of the manifold 12 (FIGS. 4 and 5).

Figure 2:
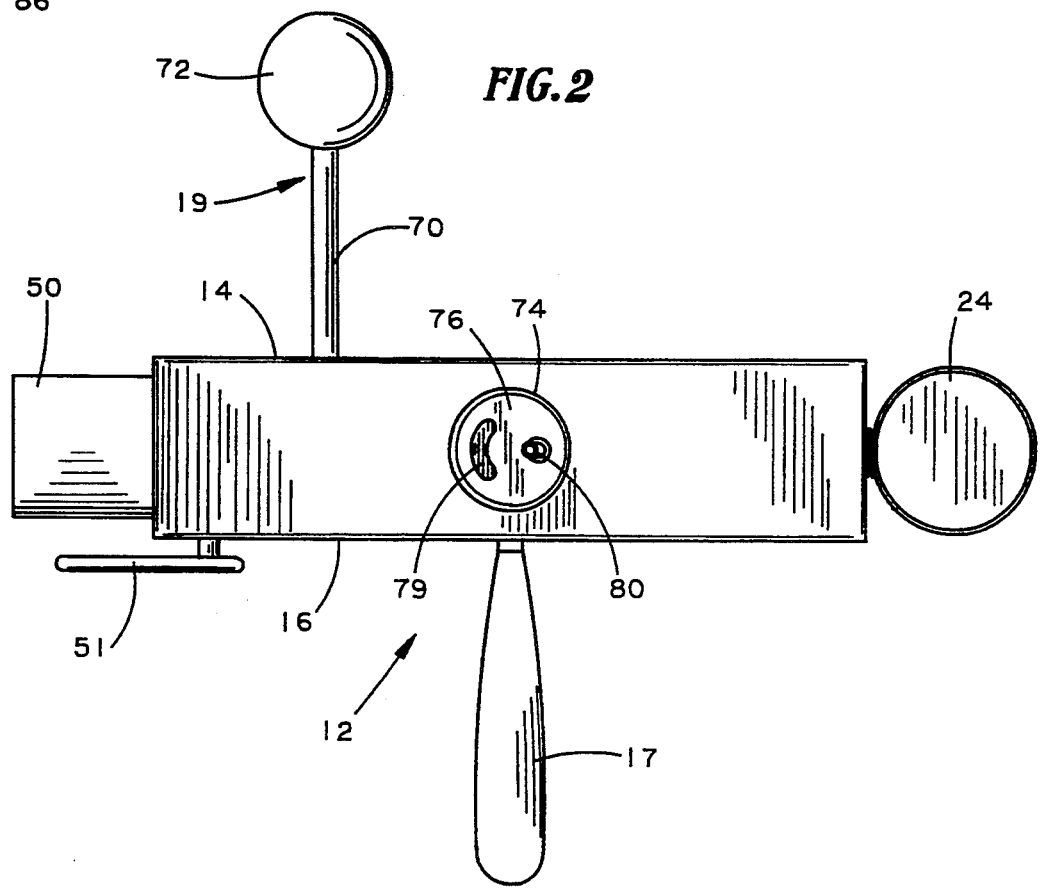
FIG. 2 is a front elevational view of the spray gun of FIG. 1 showing the static mixer removed.

The catalyst and resin passageways 18 and 20 emerge at the forward end of the manifold 12 at a ferrule mount 74 (FIG. 4). The ferrule mount 74 is a cylindrical protusion extended forwardly from the output end 76 of the manifold 12. The exterior circumference of the ferrule mount 74 is threaded so that a ferrule 78 may be screwed onto and off of the manifold 12. (FIGS. 3–4) The resin passageway 20 exits from a kidney-shaped orifice 79 in the ferrule mount 74, while the catalyst passageway 18 exits from a small injector 80 extended from the ferrule mount 74 (FIGS. 2 and 4) The injector 80 places the catalyst directly in the path of the resin, to mix the catalyst with the resin. The injector 80 also aids in forcing the catalyst and resin mixture away from the output end 76 of the manifold 12.

The static mixing tube 82 is placed over the ferrule mount 74 and the ferrule 78 is placed over the mixing tube 82, slid down the tube 82, and screwed onto the ferrule mount 74 to secure the static mixing tube 82 to the manifold 12 (FIGS. 1 and 5). In the preferred embodiment, the static mixing tube 82 is composed of an inexpensive and lightweight plastic such as polyethylene or polypropylene. These materials insure that the tube 82 does not add extraneous weight to the spray gun 10 and that the tube 82 may be disposed of each time the spray gun 10 ceases spraying resin long enough to allow the catalyzed resin to set up within the tube 82. The rearward end of the tube 82 is flanged to prevent the tube 82 from becoming detached from the manifold 12 after the ferrule 78 has been screwed into place (FIGS. 1 and 3). The forward end of the static mixing tube 82 is provided on its interior circumference with threads so that a spray tip body 84 may be screwed into the tube 82. The spray tip 86 is secured to the spray tip body 84, to controllably disburse the catalyzed resin being expelled from the spray gun 10. The threads on the static mixing tube 82 provide the spray tip 86 with the ability to be quickly disconnected from the static mixing tube 82 by hand to remove plugs during operation of the gun 10.

Placed within the static mixing tube 82 and running the entire length of the tube 82 is a spiral mixer 88 (FIG. 3). The spiral mixer 88 is preferably of a reversely flighted segmented pattern with each segment being reversely flighted from adjacent segments. This pattern is continued along the length of the spiral mixer 88 to allow homogenous mixing of the catalyst and resin as they pass through the static mixing tube 82. The tube 82 and spiral mixer 88 are preferably molded of an inexpensive plastic so that after spraying, catalyzed resin need not be removed from the tube 82. Instead of rinsing the tube 82 with a costly and hazardous solvent such as acetone, the tube is set aside until the resin hardens within the tube 82. After the resin has hardened, the tube 88 poses no more environmental hazard than a plastic stick and is simply thrown away after use. Unnecessary proliferation of toxic solvents into the environment is thereby eliminated.

The side of the static mixing tube 82 is provided with an orifice 83 into which is placed a chamfered air supply tube tip 90 (FIGS. 3 and 5). Without the induction of air into the static mixing tube 82, the heavily filled system of resin, filler, and catalyst will not shear at the spray tip 86. The mixture will instead merely emit from the spray tip in a thick stream. A rubber tip seal 92 is placed between the tube tip 90 and the static mixing tube 82 to prevent air and catalyzed resin from escaping the static mixing tube 82 through the orifice 83.

The air supply tube tip 90 is held in place by a connector assembly 94 (FIG. 5). A tube tip bracket 96 is preferably formed of a thin sheet of metal and is designed to fit around the tube tip 90 and halfway around the circumference of the static mixing tube 82. The ends of the tube tip bracket 96 extend away from the static mixing tube 82 yet parallel with one another. A securement bracket 98 is formed of a thin sheet of metal to fit securely around half of the circumference of the static mixing tube 82. The ends 100a-b of the securement bracket 98 extend outwardly from the static mixing tube 82 yet parallel with the ends 102a-b of the tube tip bracket 96. The ends 102a-b of the tube tip bracket 96 and ends 100a-b of the securement bracket 98 are supplied with holes so that they may be secured together. In the preferred embodiment, one set of ends 100a and 102a is secured with a nut and bolt while the other set of ends 100b and 102b is secured with a much larger nob screw 104. The nob screw 104 is provided so that the connector assembly 94 may be easily manipulated by an operator in the field to release the static mixing tube 82.

Figure 6:
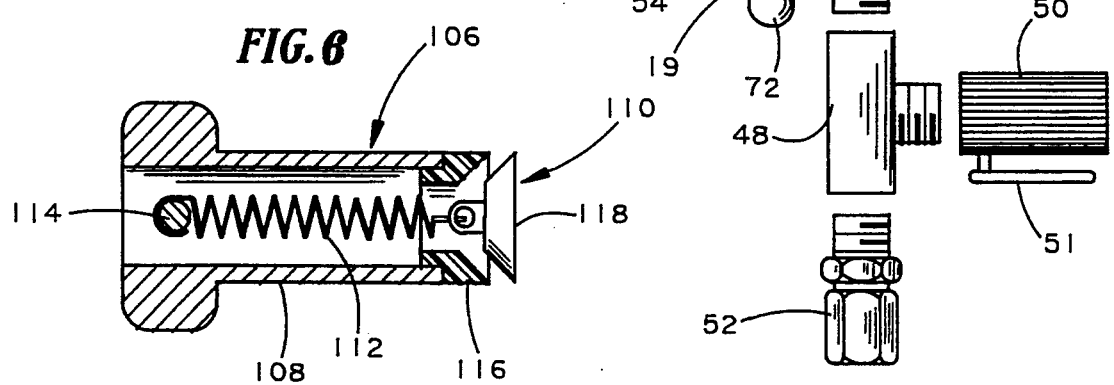
FIG. 6 is a side cross-sectional view of the check valve of the present invention.

A check valve 106 prevents the flow of catalyzed resin from backing into the air supply. The check valve 106 consists of a bolt 108 and a closure mechanism 110 (FIG. 6). The bolt 108 is hollow and is provided with a spring 112 and a spring mount 114 operably connected to both the bolt 108 and the one end of the spring 112. The opposite end of the spring 112 is connected to a frusto-conical stainless steel stopper 118. The spring 112 retains the stopper 118 in a Teflon polytetrafluoroethylene seat 116 which is secured to the circumference of the bolt 108. The Teflon polytetrafluoroethylene seat 116 is designed to engage the surface of the stopper 118 and to prevent material from passing into the bolt 108 from between the seat 116 and the stopper 118. The stopper 118 and the seat 116 are preferably constructed of dissimilar materials such as steel and Teflon polytetrafluoroethylene to prevent the catalyzed resin from sealing the stopper 118 against the seat 116 during operation of the gun 10.

The check valve 106 is designed with a five pound per square inch blow-off so that as soon as the pressure within the bolt 108 is five pounds per square inch greater than the pressure against the spring side of the stopper 118, the stopper 118 moves out of the seat 116 to allow air to pass out of the bolt 108. A particular advantage of this configuration is that the spring 112 is always in contact with air and never in contact with catalyzed resin. The closure mechanism 106 thereby protects itself from contamination and malfunction due to contact with catalyzed resin.

A 90 degree adapter 120 is used to connect the check valve 106 to an air tube 122. The air tube 122 is secured to a plug quick disconnect 124. The air tube 122 is preferably secured to the manifold 12 by a bracket or similar securement means to place the plug quick disconnect 124 near the catalyst line connector 32 and the fluid hose T-adapter 52, so that all of the hose connections may be made quickly and easily.

To begin application of catalyzed resin, the fluid hose T-adapter 52 is connected to a line supplying a resin, such as polyester, and the catalyst line connector 32 is connected to a line supplying a catalyst such as methyl-ethyl-ketone peroxide (FIG. 5). The plug quick disconnect 124 is connected to an air supply line to begin the flow of air through the air tube 122. The spray tip 86 of the gun 10 is pointed at all article which is to be treated with the spray tip 86 kept at a distance of about 12 inches from the surface of the article. The gun 10 is firmly grasped by the handle 17, while the switch handle shaft 70 is slowly moved forward to open the ball valve assemblies 30 and 44 (FIG. 1). As catalyst and resin begin to flow through the manifold 12, the catalyst gauge 24 is monitored for proper pressure. The resin and catalyst pass through the manifold 12 to meet in the static mixing tube 82. As the resin combines with the catalyst in the mixing tube 82, air supplied through the mixer tube tip 90 forces the catalyzed resin through the spray tip 86. As the catalyzed resin passes through the spray tip 86, the catalyzed resin is sheared and dispersed.

The unique design of the present invention allows resin in the range of one million centipoises (cps) to be applied to articles, whereas the maximum viscosity capable of being supplied by most prior art guns is only 20,000 cps. The ability to spray resins with an increased viscosity, which may or may not be heavily filled with fillers, allows layers of over one centimeter in thickness to be applied to a surface with each pass. This device also reduces the amount of solvent which must be added to the resin during manufacture. Reducing the amount of solvent added to the resin thereby reduces the amount of solvent which eventually evaporates into the air. The internal mixing nature of the present invention also reduces the amount of catalyst atomized directly into the atmosphere and allows the invention to be used in areas where the use of external mix apparatuses is prohibited or in areas where emissions are restricted by law.

When a particular spraying application has been completed, the switch handle shaft 70 is moved aft to terminate the flow of catalyst resin, and the air supply is thereafter shut down (FIG. 1). The thumb screw 104 is loosened to allow the air supply tube tip 90 to be pulled out of the orifice 83 in the static mixing tube 82 (FIGS. 3 and 5). The ferrule 78 is unscrewed from the ferrule mount 74, and the static mixing tube 82 is removed from the gun 10. The spray tip body 84 and spray tip 86 are removed from the static mixing tube 82, and the ferrule 78 is slid from the static mixing tube 82. The spray tip body 84, spray tip 86, and ferrule 78 are thoroughly cleaned, while the catalyzed resin remaining within the static mixing tube 82 is allowed to harden therein. Once the catalyzed resin within the static mixing tube 82 has hardened, the tube 82 no longer presents an environmental hazard and may, therefore, be disposed of in a landfill or similar depository.

When it is desired to begin spraying, the ferrule 78 is slid over a new static mixing tube 82, and the spray tip body 84 and spray tip 86 are connected to the new static mixing tube 82 (FIGS. 1 and 3). The tube 82 is then mounted to the manifold 12 by means of the ferrule 78, and the tip seal 92 is connected to the static mixing tube 82 by means of the connector assembly 94.

A particular advantage of the spray gun 10 is the elimination of any O-rings within the manifold 12. Typically spray guns have check valves located within the manifold to prevent catalyst from mixing with resin in places where the solvent flush cannot reach. These check valves generally use o-rings to obtain a tight seal against the manifold. After prolonged contact with catalyst, resin and solvent these O-rings often crack or break thereby allowing catalyzed resin by the O-rings. Once catalyzed resin has hardened around or behind the O-rings, the entire manifold must be stripped down and repaired. Furthermore, the manifold is often damaged during removal of damaged O-rings, thereby requiring replacement of the entire spray gun. As the typical spray gun may cost upwards of two thousand dollars, the elimination of easily damaged parts, such as O-rings, as in -the present invention is of great value to the industry.

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention. For example, it is anticipated to be within the scope of the invention to combine the spray gun with a fiberglass chopper to create an internal mix chop gun which may be used without the need for solvent flushing and without the worry of spraying excess solvent into the atmosphere.

What is claimed is:

1. A catalyst and resin sprayer capable of providing a resin in confluence with a catalyst whereby the resin and catalyst are mixed and atomized through the addition of pressurized air into the catalyst and resin mixture, the catalyst and resin sprayer further being capable of applying the atomized mixture to a surface to provide a catalyzed resin coating on the surface, said sprayer comprising:
    (a) a mixer capable of receiving the resin and the catalyst and mixing the resin and the catalyst into a substantially homogeneous mixture, said mixer further being capable of receiving the pressurized air in confluence with the resin and the catalyst to thereby produce an atomized flow of resin and catalyst;
    (b) a manifold operably connected to said mixer comprising:
        (i) a block having a first side and a second side;
        (ii) at least a pair of passages extending from said first side of said block to said second side of said block; and
        (iii) wherein said pair of passages are of a construction which allows resin and catalyst to pass freely from said first side of said block to said second side of said block through said pair of passages and which allows resin and catalyst to pass freely from said second side of said block to said first side of said block through said pair of passages;
    (c) an injector operably connected to said manifold, said injector extending outward from said manifold and into said mixer, said injector being of a construction which allows catalyst to pass through said injector from one of said pair of passages and directs the catalyst into a stream of resin exiting said manifold from the other of said pair of passages while preventing catalyst from mixing with resin within the confines of said manifold;
    (d) means operably connected to said mixer for directing the pressurized air to said mixer so that the pressurized air may be added in confluence with the resin and the catalyst to produce said atomized flow of resin and catalyst; and
    (e) means for spraying said atomized flow of resin and catalyst onto the surface to provide the catalyzed resin coating on the surface.

2. The sprayer of claim 1, wherein said pair of passages are substantially unobstructed from said first side of said block to said second side of said block.

3. The sprayer of claim 1, wherein said mixer is a disposable mixer releasably attached to said manifold so that said disposable mixer may be easily removed from said manifold and replaced.

4. The sprayer of claim 3, wherein said manifold has a resin outlet and a catalyst outlet.

5. The sprayer of claim 4, wherein said disposable mixer is operably connected to said resin outlet and said catalyst outlet of said manifold.

6. The sprayer of claim 3, further comprising a disposable corkscrew mixer located within said disposable mixer.

7. The sprayer of claim 3, wherein said spraying means is a spray tip releasably connected to said disposable mixer.

8. The sprayer of claim 3, further comprising hand removal means for allowing said disposable mixer to be removed from said manifold by hand.

9. The sprayer of claim 8, wherein said hand removal means is a threaded ferrule connecting said disposable mixer to said manifold.

10. The sprayer of claim 1, wherein the cross-sectional area of said one of said pair of passages is smaller than the cross-sectional area of the other of said pair of passages.

11. A catalyst and resin sprayer capable of providing a resin in confluence with a catalyst whereby the resin and catalyst are mixed and atomized through the addition of pressurized air into the catalyst and resin mixture, the catalyst and resin sprayer further being capable of applying the atomized mixture to a surface to provide a catalyzed resin coating on the surface, said sprayer comprising:
    (a) a mixer capable of receiving the resin and the catalyst and mixing the resin and the catalyst into a substantially homogeneous mixture, said mixer further being capable of receiving the pressurized air in confluence with the resin and the catalyst to thereby produce an atomized flow of resin and catalyst;
    (b) a manifold operably connected to said mixer comprising:
        (i) a block having a first side and a second side;
        (ii) at least a pair of passages extending from said first side of said block to said second side of said block; and
        (iii) wherein said pair of passages are of a construction which allows resin and catalyst to pass freely from said first side of said block to said second side of said block through said pair of passages and which allows resin and catalyst to pass freely from said second side of said block to said first side of said block through said pair of passages;

(c) valving means for manipulating the flow of resin and catalyst through said manifold, wherein all of said valving means are located exterior of said manifold, and said manifold being devoid of any additional valving means therewithin, (d) means provided within said manifold for preventing the mixing of catalyst and resin within said manifold until said catalyst and resin move downstream of said manifold;

(e) means operably connected to said manifold for mixing catalyst and resin downstream of said manifold;

(f) means operably connected to said mixer for directing the pressurized air to said mixer so that the pressurized air may be added in confluence with the resin and the catalyst to produce said atomized flow of resin and catalyst; and (g) means for spraying said atomized flow of resin and catalyst onto the surface to provide the catalyzed resin coating on the surface.

* * * * *